March 27, 1956    G. J. PFISTER ET AL    2,739,463
SHEAR PIN COUPLING
Filed Feb. 6, 1952

INVENTOR.
GEORGE J. PFISTER
GEORGE J. PFISTER Jr.
BY
Erwin B. Giring
ATTORNEY

United States Patent Office 2,739,463
Patented Mar. 27, 1956

2,739,463

SHEAR PIN COUPLING

George J. Pfister and George J. Pfister, Jr.,
Wauwatosa, Wis.

Application February 6, 1952, Serial No. 270,262

2 Claims. (Cl. 64—28)

This invention relates to couplings and more particularly to those of the shear pin type.

While the present invention was developed primarily for use in conjunction with spiral, auger or screw type coal conveyors such as that shown in our copending application Serial No. 268,594, it is obviously well adapted for numerous other auger type material conveying applications.

Many shear pin couplings have been constructed for the purpose of affording a shearable power transmitting coupling between a driving and a driven shaft. However, the majority of these devices have not proved to be entirely satisfactory in their operation, in numerous applications, for one of several reasons. One particular application which has pointed out the shortcomings of several well known and commonly used types of shear pin couplings, is their use in conjunction with auger conveyors, wherein the equipment normally runs unattended over extended periods of time and wherein serious damage may be inflicted to the equipment in its unattended operation.

The most common shortcoming of previously constructed shear pin couplings resides in their failure to provide adequate means for retaining substantial alignment between the adjacent ends of the driving and driven shafts, after the shear pin has been fractured, to permit continued running of the driving means without resulting in damage to the equipment. Another common fault of prior devices of this type resides in their failure to afford adequate means for retaining the adjacent ends of the coupled shafts against axial separation upon the fracture of the shear pin. Still another common fault, and source of much concern, is found in the difficulty frequently encountered in effecting the removal of the parts of a fractured shear pin in order to provide a replacement part for the same.

The primary object of the present invention resides in the provision of a new and improved shear pin coupling which will overcome the several objections commonly found in previous couplings of this type.

Another object of the invention resides in the provision of a shear pin coupling constructed in a manner to retain the adjacent ends of the driving and driven shafts in substantial alignment after the shear pin has been fractured, to permit continued operation of the driving means without causing further damage to the equipment.

Another object of the invention resides in the provision in a shear pin coupling of means operative to prevent the axial separation of the adjacent ends of the driving and driven shafts after the fracture of the shear pin.

Another object of the invention resides in the provision in a shear pin coupling of means for obviating the removal of the parts of a fractured shear pin and facilitating its replacement.

A more specific object of the invention resides in the provision of a new and improved shear pin coupling which is simple in construction, relatively inexpensive to manufacture, effective in operation and one in which the replacement of a fractured shear pin may be expeditiously effected.

Other objects and advantages will become apparent from the following description of an illustrative embodiment of the present invention.

Before entering into a detailed description of the embodiment of the present invention, chosen for illustrative purposes in the accompanying drawing, it is deemed advisable to refer to some of the problems involved in the application of shear pin couplings in general and more particularly to their application to equipment such as auger type coal conveyors and the like. At the outset, this general type of equipment is not produced to the same degree of nicety frequently found in precision machines and hence precise alignment between the driving and driven shafts is rarely, if ever, encountered. For this reason, we have chosen to include in our disclosure a mechanism in the form of a double run chain loosely trained about a pair of sprockets disposed in adjacent face to face relationship as a means for compensation for common axial or angular misalignment between the adjacent ends of the driving and driven shafts which carry separate parts of the shear pin coupling. Obviously any similar or suitable mechanism may be employed for this purpose and it is to be understood that the same may be applied with equal facility to either the driving or driven shaft without being incorporated in the pin coupling.

Another problem common to shear pin couplings for auger stoker feeds or coal conveyors lies in the fact that the shearing of the driving pin frequently results in the separation of the adjacent ends of the driving and driven shafts at the point of their coupling and by reason of the continued operation of the driving mechanism, the drive shaft may fall or become jammed in a manner to cause serious damage to the driving motor or the transmission mechanism.

Figure 1:
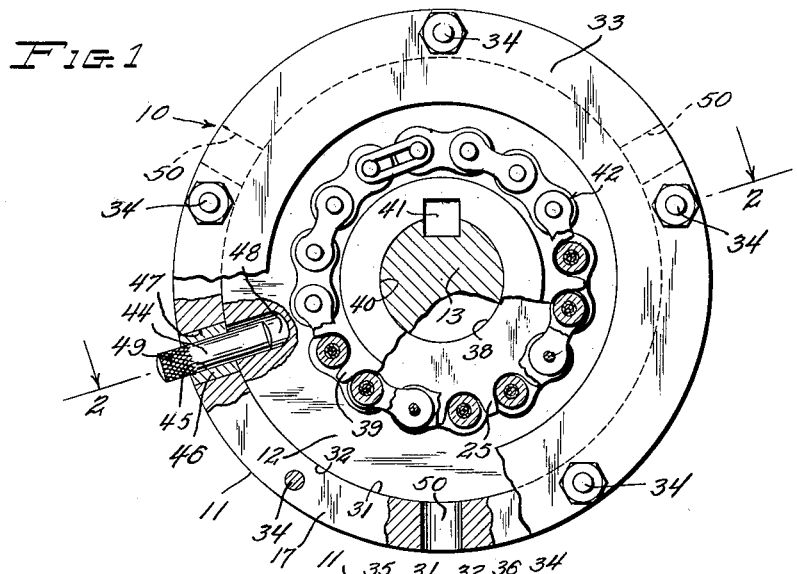
Figure 1 is a front elevational view of a shear pin coupling, constructed in accordance with the teachings of the present invention, with parts broken away and shown in section to better illustrate certain details of construction.

Referring more particularly to Fig. 1 of the accompanying drawing, it will be noted that shear pin coupling 10, chosen for illustrative purposes and embodying the teachings of the present invention, comprises a pair of members 11 and 12 adapted for respective connection with shafts 13 or 14 either of which may be the driving shaft with the other being the driven shaft. For the purpose of the present description, we shall consider the shaft 13 as the power input or driving shaft and the shaft 14 as the power output or driven shaft of the coupling 10. In like manner, it is immaterial whether the coupling 10 be connected with the member 11 or the member 12 secured or connected to one or the other of the shafts 13 or 14. For the purpose of clarity and uniformity, the member 11 will be referred to as the housing member and the member 12 will be referred to as the housed member.

Figure 2:
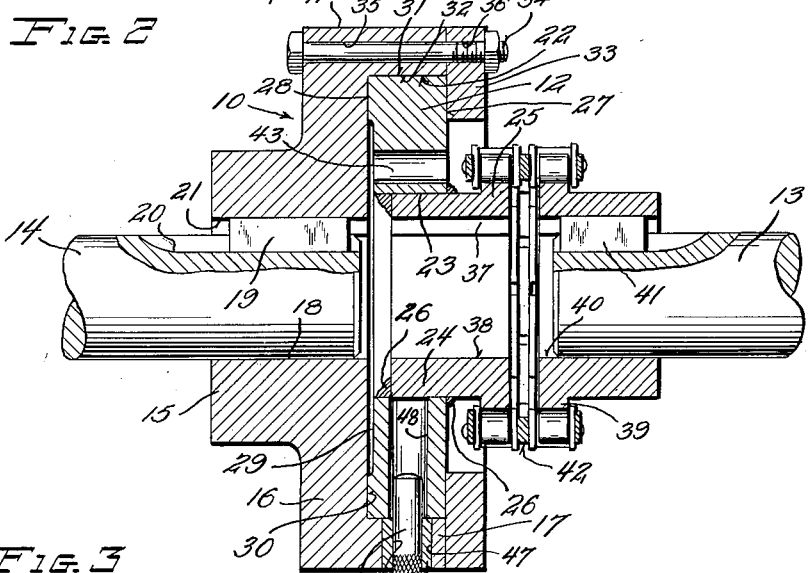
Fig. 2 is a substantially horizontal longitudinal sectional view through the device taken on the line 2—2 of Fig. 1.
Figure 3:
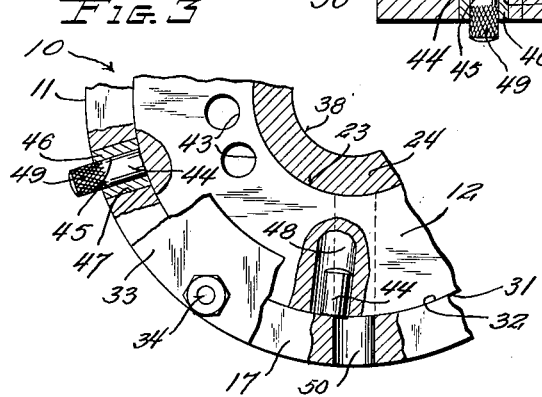
Fig. 3 is a fragmentary elevational view of a portion of the shear pin coupling, with parts broken away and shown in section, to illustrate the facility with which the sheared free end of the pin may be removed from the coupling.

Referring more particularly to Fig. 2, it will be noted that the housing member 11 comprises a casting including a hub portion 15, a body portion 16 and a marginal flange portion 17. The hub portion 15 is provided with an axial bore 18 adapted to receive the end of the shaft 14 and is retained thereon in any appropriate manner, such as by the application of a key 19 fitted in suitable key ways 20 and 21 formed respectively in the shaft 14 and the hub 15 of the member 11. A circular recess 22 formed in the body portion 16 of the member 11 serves to receive the housed member 12 which comprises a circular disc having a central axially disposed bore 23 adapted to receive a hub portion 24 of a chain sprocket 25 which is preferably secured in the bore 23 by means of welding 26 to form a unitary structure. The member 12 is provided with relatively smooth front and rear faces 27 and 28 respectively; the latter of which is relieved by a central recess 29 to reduce the surface thereof disposed adjacent the base 30 of the recess 22. The member 12 includes a peripheral face 31 having a diameter slightly less than the diameter of the recess 22 to position the face 31 normally in slightly spaced relationship with a similar face 32 which forms the peripheral surface of the recess 22. In order to retain the housed member 12 against axial separation from the housing member 11, a retainer ring 33 is secured to the face of the member 11 adjacent the front face 27 of the member 12. The retaining ring 33 is anchored in proper position on the member 11 by the application of a plurality of anchor bolts 34 which pass through aligned holes 35 and 36 formed respectively in the member 11 and ring 33.

It should be noted at this time that the chain sprocket 25 is provided with a key way 37 formed in an axial bore 38 which, if desired, could provide a driving connection for the drive shaft 13. In the present instance, however, we have chosen to utilize the chain sprocket 25 as one member of a means for compensating for either axial or angular misalignment between the driving shaft 13 and the driven shaft 14. The other member of this means comprises a chain sprocket 39 which is identical with the sprocket 25 and disposed in adjacent spaced face to face relationship therewith. The sprocket 39 includes an axial bore 40 adapted to receive the end of the driving shaft 13 which may be secured therein in any appropriate manner, such as by the application of a key 41 in a manner similar to that previously described in connection with the securing of the housing member 11 on the driven shaft 14. A double run anti-friction roller chain 42 is loosely trained about the adjacent sprockets 25 and 39 to provide a positive driving connection therebetween. The looseness of the chain 42 on the sprockets 25 and 39 serves to compensate for axial or angular misalignment between the shafts 13 and 14 so that the device may operate freely in spite of either or both of the misalignments, previously referred to, between the adjacent ends of the shafts 13 and 14. In order to facilitate the positioning of the chain 42 on the sprockets 25 and 39, a plurality of circumferentially spaced holes 43 are formed in the member 12 in a radial position to align them with the adjacent pins of a repair link so that the same may readily be applied to connect the adjacent ends of the chain 42.

The driving connection between the members 11 and 12 of the coupling 10 comprises a shear pin 44 which is preferably retained in a central bore 45 of an insert sleeve 46 which, in turn, is pressed into a bore 47 disposed radially through the flange portion 17 of the member 11. The inner end of the shear pin 44 is receivable in a radially disposed bore 48 formed in the member 12 of the coupling 10. It should be noted at this time that the diameter of the bore 48 is slightly larger than the diameter of the shear pin 44 to permit slight relative rotational movement between the members 11 and 12 of the coupling 10. It should also be noted that the outer extremity on the face of the pin 44 is provided with knurling 49 which serves to releasably position the pin 44 properly in the bore of the sleeve 46.

In the present coupling, we have chosen to utilize a steel casting for the member 11, a steel plate for the member 12, a steel insert for the sleeve 46 and a brass pin for the shearing member 44. This combination of elements affords a highly satisfactory choice of materials which provide the desired results. In the event of undue shock, or sustained overloads the shear pin 44 will fracture to disengage the driving connection between the driving and driven members of the coupling 10.

The present coupling provides a construction which will permit continued rotation of the driving member without causing further damage to the remainder of the equipment. This condition is made possible by the fact that the coupling 10 provides a support for the disengaged shaft and simultaneously precludes axial separation of the shafts from the coupling 10 in spite of the fact that the driving connection between them have been severed by reason of the fracturing of the shear pin 44.

In many instances where previously designed shear pin couplings have been employed, the fracturing of a shear pin required considerable time and effort to effect its replacement or repair. The present coupling provides simple and effective means for the removal of the free end of the fractured shear pin 44 by the provision of a radially disposed bore 50 located in a vertical plane common to that of the pin 44 and disposed in circumferentially spaced relationship with the pin 44. After the pin 44 has been sheared the housing member 11 of the coupling 10 may be rotated to a position in which the bore 50 lies at the bottom position of its rotation. The housed member 12 of the coupling 10 may then be similarly rotated until such time as the bores 48 and 50 come into alignment; at which time, the free end of the shear pin 44 will fall from the coupling. The portion of the shear pin 44 which remains in the sleeve 46 may readily be removed therefrom by gripping the same tightly with a pair of pliers and drawing the pin from the insert 46. A new shear pin may be slid into the sleeve 46 until its inner end rides on the outer surface of the member 12; and the member 12 may then be rotated until such time as the bore 48 comes into alignment with the axial bore of the sleeve 46, at which time the pin may be pressed into its desired position to provide a driving connection between the cooperating members 11 and 12 of the coupling 10.

From the foregoing description, it will readily be understood that the present invention provides a simple and effective shear pin coupling which will permit continued operation of the driving shaft of the device without fear of damage to any portion of the equipment even after fracture of the shear pin. This condition is made possible by the fact that the housing member of the coupling 10 serves to maintain the housed member 12 in substantial axial alignment therewith and simultaneously retain against axial separation of the adjacent ends of the shafts from their normal positions with respect to coupling 10. To further insure against damage to the cooperating parts of the coupling a graphite or similar grease or other lubricant may be applied to the cooperating surfaces of the members 11 and 12 to insure free relative rotation between them without fear of damage to either of them. In addition to the above mentioned advantages of the present coupling, it should be noted that the simple and effective means for removing and replacing a sheared driving pin affords a marked saving of time and effort when repair and replacement are required.

While the invention has been described in considerable detail in the foregoing specification, it is to be understood that various changes may be made in its embodiment without departing from or sacrificing any of the advantages hereinafter claimed.

We claim:

1. A shear pin coupling comprising a pair of members for respective attachment to driving and driven shafts, each of said members including a hub portion having an axially disposed shaft receiving bore and a flange portion, the flange portion of one of said members forming a circular recess for rotatably receiving and housing the flange portion of said other member, a radially disposed bore in each of said flange portions, said radial bores having their axes lying in a common vertical plane and arranged for axial alignment upon relative rotation between said members when they are operatively associated, a shear pin having one portion frictionally retained in said housing flange bore and another portion extending into and loosely contained within said housed flange bore to provide the driving connection between said coupling members, and an auxiliary radially disposed bore in said housing flange circumferentially spaced from said other housing flange bore and having its axis in the same vertical plane as said last mentioned bore, said auxiliary radially disposed bore having a diameter greater than that of said shear pin to provide an opening adapted to be aligned with the radial bore in said housed flange to facilitate the removal of that portion of said shear pin contained within said housed flange after rupture of said pin without necessitating the dismantling of said coupling.

2. A shear pin coupling, as set forth in claim 1, in which the radial bore in said housed flange and the auxiliary radial bore in said housing flange are both of greater diameter than that portion of the shear pin disposed within the radial bore of said housed flange.

References Cited in the file of this patent

UNITED STATES PATENTS

| | | |
|---|---|---|
| 292,095 | Carlson | Jan. 15, 1884 |
| 1,637,944 | Keller | Aug. 2, 1927 |
| 1,870,153 | Thoman | Aug. 2, 1932 |